Sept. 3, 1968     J. LOOMAN ET AL     3,399,599
GEAR HOBBING MACHINE

Filed Sept. 27, 1966     5 Sheets-Sheet 1

INVENTORS
JOHANNES LOOMAN
FRIEDRICH STRIEPE

BY *Albert W. Zalkind*

ATTORNEY

INVENTOR
JOHANNES LOOMAN
FRIEDRICH STRIEPE

BY Albertus Zalkind
ATTORNEY

INVENTOR
JOHANNES LOOMAN
FRIEDRICH STRIEPE

United States Patent Office 3,399,599
Patented Sept. 3, 1968

3,399,599
GEAR HOBBING MACHINE
Johannes Looman and Friedrich Striepe, Friedrichshafen, Germany, assignors to Zahnradfabrik Friedrichshafen, Aktiengesellschaft, Friedrichshafen, Germany
Filed Sept. 27, 1966, Ser. No. 586,327
Claims priority, application Germany, Oct. 1, 1965, Z 11,782
1 Claim. (Cl. 90—8)

ABSTRACT OF THE DISCLOSURE

The particular feature of the invention resides in a mechanism for driving a rotary cutter which an axis that is angular with respect to a workpiece and wherein such drive is effected through a pair of worms driving a common worm gear carried in a housing having a pivotal axis which is the same as that of the cutter and is also the axis of one of the worms.

This invention relates to gear hobbing machines and more particularly to the type of machine in which the cutting gear and the workpiece gear rotate at a fixed ratio with respect to each other and wherein the cutting gear reciprocates in the course of cutting teeth on the workpiece.

In prior art gear cutting machines there has always been difficulty in producing accurately cut teeth due to the fact that a substantial relief of the lateral flanks of the teeth of the cutting gear or tool is required and when such a tool is reground considerable distortion of the profile is experienced. This is due to the considerable conicity of the external shape of the cutting tool produced by so-called slope-back-grinding for effecting the cutting relief angle that is required.

Conventionally, such gear cutting machines provide for angular adjustment of the axis of the cutting gear with respect to the axis of the gear being cut, that is, the workpiece. Thus, the axis of the cutting gear is pivotal in a plane which is parallel to the axis of the workpiece and, for that reason, conicity of the cutting gear must be provided in order to effect cutting relief, with the disadvantages noted above.

It is an object of the present invention to provide a gear cutting machine wherein the cutting tool will cut much more accurately with a simpler cutting tool that may be reground repeatedly with no serious change in cutting profile or wherein the change can readily be compensated for by regrinding of the rake angle at the bottom of the cutting teeth.

Other objects and features of the invention will be apparent from the description that follows.

Briefly, the invention contemplates a gear cutting machine having the improvement wherein the axis of the cutting tool is angularly set with respect to the axis of the workpiece gear blank so that it is no longer in a plane parallel therewith as found in conventional machines. By such skewing of the cutter axis the cutting tool need be provided with no external conicity for purposes of relief or with very little conicity.

A more detailed description of the invention now follows in conjunction with the appended drawing in which.

Figure 1:
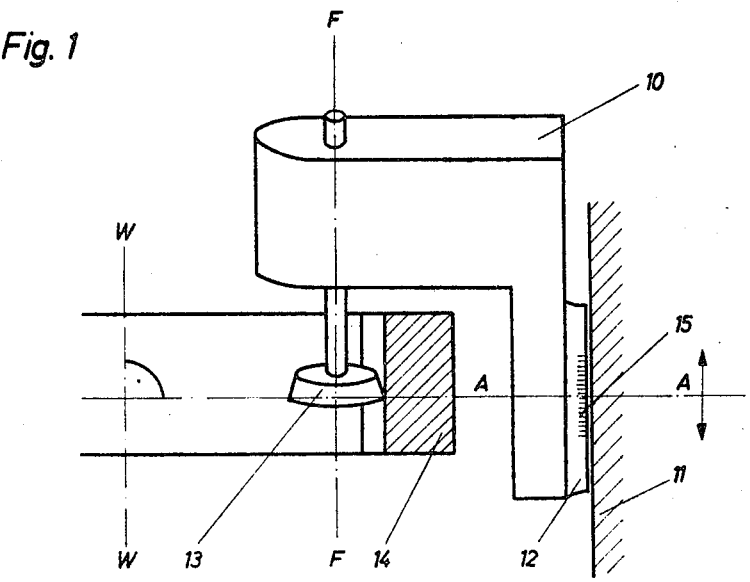
FIG. 1 shows the essential components found in a conventional gear cutting machine to the extent that such components are related to the present invention for purposes of comparison.
Figure 2:
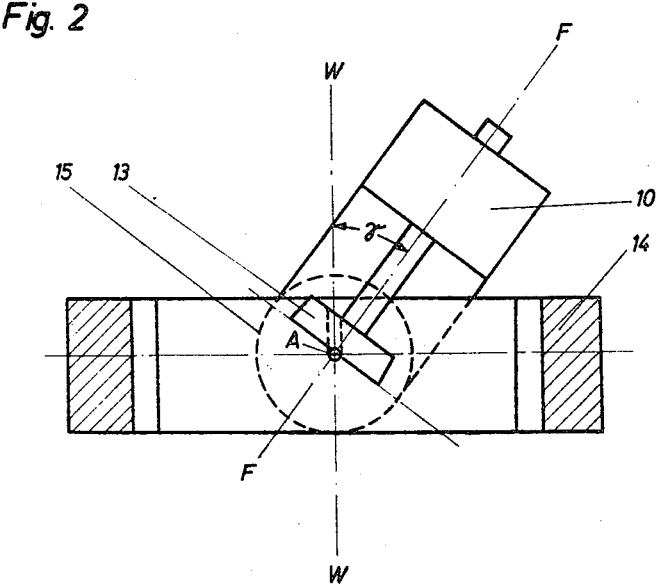
FIG. 2 is a front view of such conventional machine.

Referring to FIGS. 1 and 2, the conventional arrangement is shown wherein the cutter head 10 carries a rotary cutting gear tool 13 having the axis F—F. The head 10 is swiveled on the machine slide 11 and has a scale flange 12 with the indicia scale 15 by which the angle $\gamma$ of the head 10 is measurably set, as is understood by persons skilled in the art. Thus, the cutter 13 has its axis always in a plane parallel to the axis W—W of the workpiece 14. The rotational axis A—A of the head 10 thus intersects the workpiece W—W at right angles at all times.

Figure 3:
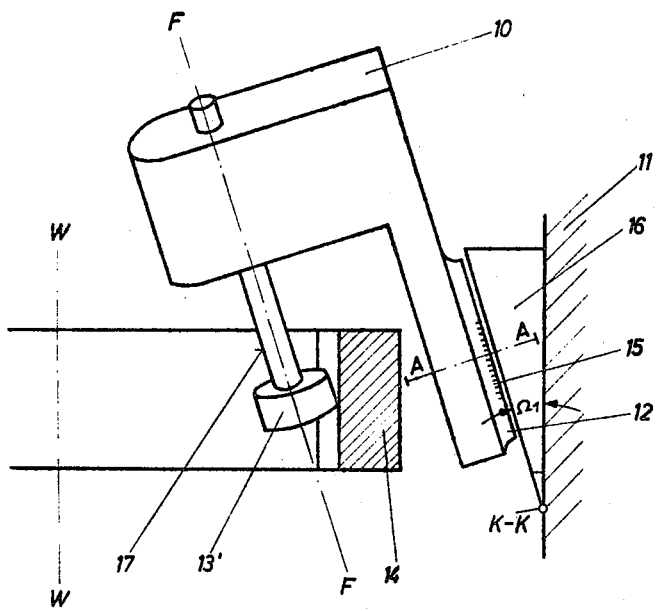
FIG. 3 shows essentially the same components but wherein the improvement of the invention is illustrated, the view being a side view.

In contrast to the above arrangement, the invention provides, as shown in FIG. 3, a construction wherein the head 10 is skewed so that the cutter axis F—F is at an angle $\Omega_1$ with respect to the axis W—W of workpiece 14. Accordingly, the shaft 17 of the cutter tool 13' is skewed with respect to axis W—W and this is effected by a wedge component 16 which carries the head 10 by means of any suitable pivotal construction permitting adjustability on the axis A—A for purposes of adjusting the angle $\gamma$ (not shown in FIG. 3). Accordingly, the angle $\Omega_1$ effects a slanting of the cutter axis around the horizontal axis K—K to a fixed angle which may be of the order of about 8°, or in the range 5°–10°.

It will be particularly noted that the cutter 13' in FIG. 3 is substantially cylindrical in external contour although it may be provided with a slight conicity.

Figure 4:
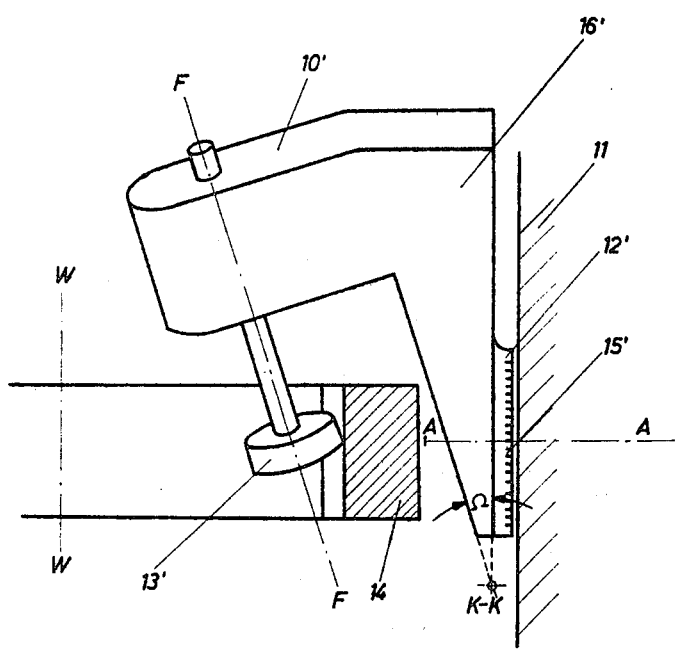
FIG. 4 is a modification of the arrangement shown in FIG. 3 and likewise being a side view.

FIG. 4 is a variation of the construction of FIG. 3 wherein the head 10' is fashioned with a wedge-shape component 16' pivotally secured on the horizontal axis A—A to provide the skewing angle $\Omega$ with respect to the horizontal axis K—K. In the conventional manner the head 10' is swiveled on axis A—A to slide 11 and provided with the scale flange 12' carrying the indicia scale 15' for setting of the angle $\gamma$ (FIG. 2) whereby the relationship of the cutting axis F—F of the cutter 13' is established with respect to the workpiece axis W—W of workpiece 14 as a matter of adjustment. The angle $\Omega$ in this case is fixed at some predetermined value and again it should be noted that the cutter 13' may be cylindrical or have slight conicity.

Figure 5:
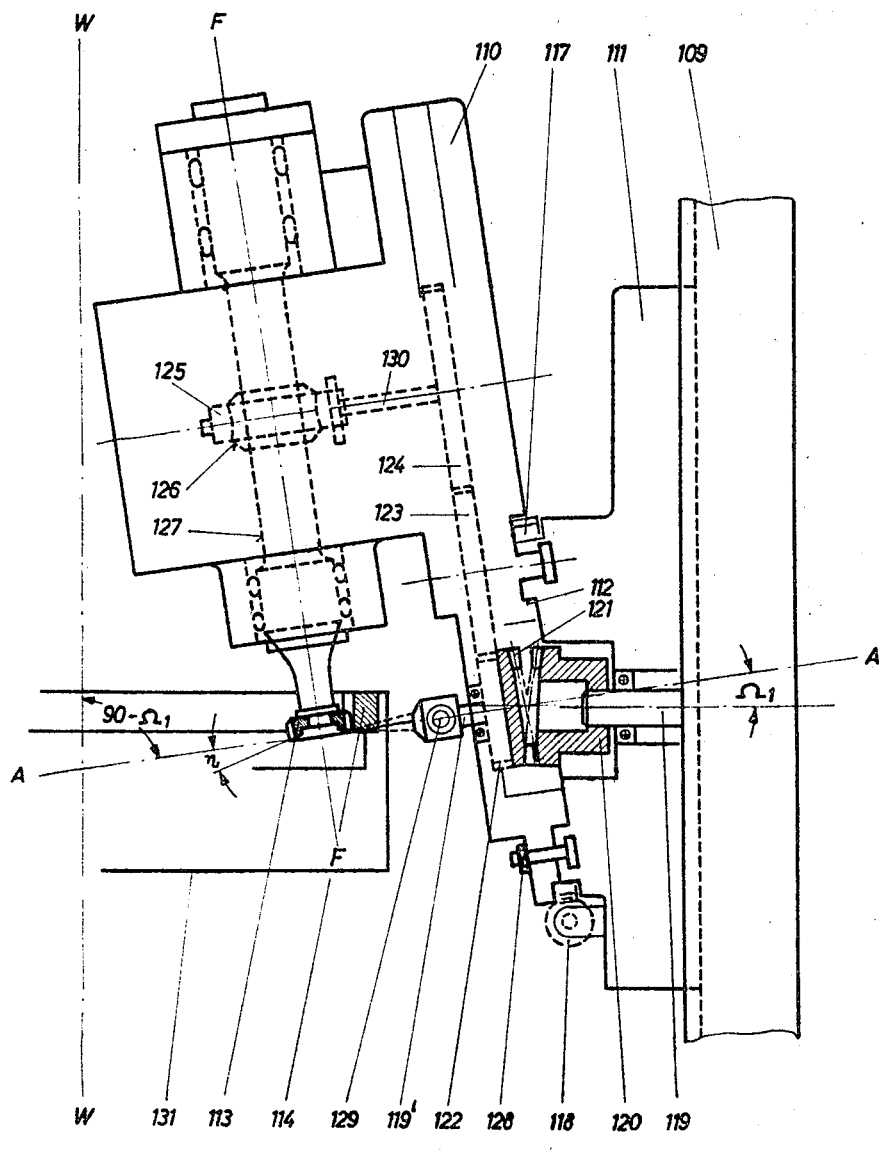
FIG. 5 shows a construction comprising the elements for producing rotation of the skewed cutting tool for cutting an external gear.

By thus providing skewing of the cutting axis the heavy back-ground relief of the cutting gear is avoided and, accordingly, regrinding of the gear will have little or no effect on the profile of teeth being cut due to the elimination of the external conicity or substantial elimination.

Where regrinding might affect a cutting, an accuracy compensation therefor can be had by variation of regrinding angle for the rake angle $n$ which will be found in FIG. 5, a modification now to be described.

Referring to FIG. 5, the machine frame 109 is illustrated which carries the reciprocal slide 111 provided with a suitable cavity for accommodating the rotational drive shaft 119 for the cutter as well as a slant faced bevel gear 120 keyed to that shaft.

It will be understood that a suitable flexible power transmission for shaft 119 is provided although not shown. The bevel gear 120 is angularly related, as indicated by the phantom lines with a bevel gear 121 carried on shaft 119' to which is keyed a spur gear 122 that drives an intermediate gear 123 in turn driving a further spur gear 124 rotating worm shaft 130 of worm 125 to rotate worm gear 126 and thus effect rotation of the cutter shaft 127 which carries the cutter 113. Such rotation is on axis F—F and it will be understood that the cutter and the several gears described are all carried in the cutter head 110 which in turn is mounted on the slide 111 and which head 110 is rotative on the axis A—A to adjust the angle $\gamma$ (FIG. 2). Thus, a rim gear 117 is carried by the head 110 and meshes with a worm 118 which may be provided with a hand crank (not shown). The worm 118 is carried on the slide 111 and rotation of the worm will thus, via the rim gear 117, rotate the head and the axis F—F of the cutter around the axis A—A. The indicia element 112 is provided on the head 110 in order to measure a desired angle $\gamma$ and screws such as 128 are provided in order to hold the head 110 in angularly adjusted position whereby the cutter 113 is properly set as to the angle $\gamma$ with respect to work 114 which will be understood to be carried on a table 131 having a fixed ratio of rotation with respect to the cutter rotation, the work rotating around the axis W—W. In this instance, the skew angle $\Omega_1$ is set by the slope of the front surface of slide 111 against which the mating surface of head 110 is contiguous, as will be evident from FIG. 5. Support of head 110 on slide 111 can be afforded in a conventional manner as by a T-head, as shown, and by the use of T-bolts such as 128, the T-head and T-bolts, of course, riding in a circular slot or slots, all of which will be clearly understood by persons skilled in the art.

As a matter of convenience for proper initial setting of the cutting tool a sighting device 129 is carried by head 110 and this device is aligned so that its optical axis is in alignment with the axis A—A and the tool is set so that the center of a cutting tooth is aligned with axis A—A.

The cutting tool may be provided with background relief in a very small amount; for example, 0.1° to 0.5°. Further, the rake angle $n$ may be varied, if required, to compensate for any inaccuracy of flank shape of teeth being cut.

It will be understood that other rotary drives for the cutter shaft can be provided.

Figure 6:
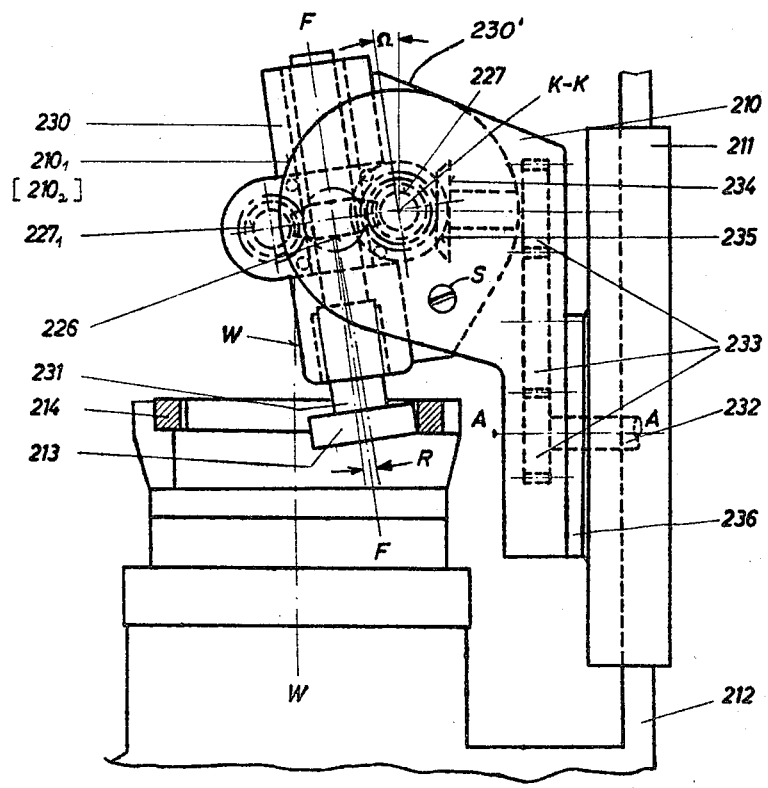
FIG. 6 shows a modification of FIG. 5.

Referring to FIG. 6, the modification therein provides for a limited adjustability of the skew angle $\Omega$ which may be varied from a nominal 8° to a preferred range of 1° either way, that is, ±1°. In the modification of FIG. 6 the arrangement is for cutting an internal gear 214 by means of a cutter 213 carried by the cutter head 210. The angle $\gamma$ (FIG. 2) may be adjusted by the construction shown wherein the head 210 is pivotally carried on the slide 211, the measuring scale being on the flange 236 of the cutter head. Any suitable pivotal construction for this purpose may be utilized so that the cutter head can be agularly adjusted around the horizontal axis A—A. The construction also provides a housing 230 for the cutter shaft 231, which housing is pivotally carried between a pair of cheeks $210_1$ and $210_2$. Thus, housing 230 is pivotal around the horizontal axis K—K.

The drive for the cutter is effected via shaft 232 on the axis A—A and gears 233, which are three spur gears driving bevel gear 234 which drives bevel gear 235 coaxial with the axis K. The bevel gear 235 drives a worm 227 which meshes with a worm gear 226 on one side of the worm gear. Bevel gear 235 also drives another worm $227_1$ via three spur gears (not shown) which latter worm is on the other side of the worm gear 226. Thus, the worms are braced against each other and prevent any play of worm gear 226 which is slidably splined with the axially adjustable cutter shaft 231. Accordingly, adjustment of the housing 230 to vary the skew angle $\Omega$ is possible, such adjustment being provided by rotation of housing 230 on the shaft of worm 227, guided by the cheeks on head 210 between which the support arc 230' of head 230 is disposed. A setscrew S may be utilized to lock head 230 in adjusted position in the arcuate range R.

Figure 7:
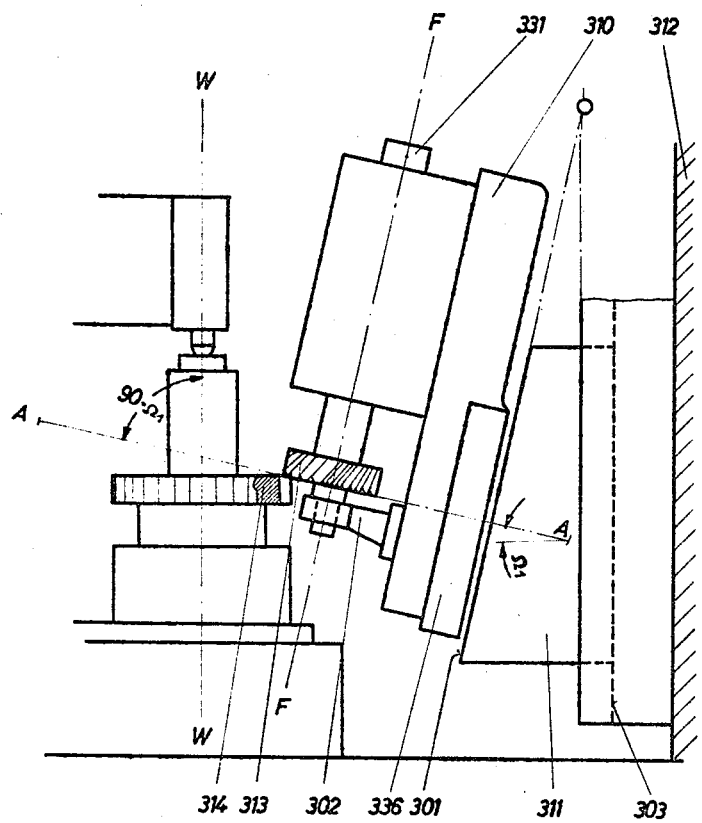
FIG. 7 shows a modification of the invention for cutting a conventional spur gear.

In the embodiment of FIG. 7 an arrangement is shown for cutting a conventional spur gear wherein the cutter head 310 is inclined at an angle $\Omega$, the usual adjustment for angle $\gamma$ on axis A—A being understood to be provided whereby the scale flange 336 is used for setting the angle. The skew angle $\Omega_1$ is provided by the sloping face 301 of the slide 311 carried by the machine frame 312 in the channel 303. In this instance, the cutter 313 is detachably mounted by means of the bearing support arm 302 carried by the cutter head 310. Thus, the cutter will shave the work 314 which is rotated on the axis W—W in the usual manner, suitable rotation of the cutter via shaft 331 being provided.

From the foregoing description, it will be apparent that two basic constructions are shown, e.g., FIGS. 3, 5 and 7 wherein the axis A—A is inclined and FIGS. 4 and 6 wherein the axis A—A is horizontal. In either instance that axis intersects the gear blank axis W—W. On the other hand, the axis F—F is usually skewed with respect to axis W—W, although for simplicity it is shown intersecting in FIGS. 5–7 as it might be for a particular tooth shape. In any event, the axis F—F is always carried at an angle to the horizontal axis K—K although the slant angle may be in one direction or another depending on whether internal or external teeth are being cut.

We claim:
1. In a gear cutting machine, means for effecting relative rotation and reciprocation between a workpiece and a rotary cutter, and means for securing said rotary cutter so that the axis of rotation is supported at a predetermined angle ($\gamma$) about an axis (A—A) which intersects the axis (W—W) of said workpiece at another angle about an axis (K—K) which is spaced from and normal to the axis (W—W) of said workpiece, a cutter head and a rotary cutter shaft carried thereby, a housing for said shaft pivotally mounted to said cutter head whereby said housing may be angularly adjusted to said axis which is spaced from and normal to the workpiece axis, including a drive for said rotary cutter comprising a worm gear secured to said shaft and a pair of worms disposed on respective sides of said worm gear and carried by said housing, wherein the pivotal axis of said housing and said cutter head is the axis of one of said worms.

References Cited
UNITED STATES PATENTS

| | | | |
|---|---|---|---|
| 1,628,864 | 5/1927 | Trbojevich | 90—4 |
| 1,820,409 | 8/1931 | Trbojevich | 90—4 |
| 2,598,327 | 5/1952 | Wildhaber | 90—7 |

LEONIDAS VLACHOS, *Primary Examiner.*